US012675575B2

(12) United States Patent
Alkhawaja et al.

(10) Patent No.: US 12,675,575 B2
(45) Date of Patent: Jul. 7, 2026

(54) METHOD AND APPARATUS FOR AUTOMATICALLY VALIDATING APPLICATION TRANSPORT ROLLOUTS

(71) Applicant: SAUDI ARABIAN OIL COMPANY, Dhahran (SA)

(72) Inventors: Aqeel Hussain Alkhawaja, Dammam (SA); Munther Saad Alsaeed, Dammam (SA); Hamad Abdullatif Almaghlouth, Al Khobar (SA); Mohammad Youssef Alabdulqader, Dammam (SA); Abdulrahim Abdulhamid Aljahdali, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 220 days.

(21) Appl. No.: 18/413,558

(22) Filed: Jan. 16, 2024

(65) Prior Publication Data

US 2025/0232035 A1 Jul. 17, 2025

(51) Int. Cl.
*G06F 21/57* (2013.01)
*G06F 8/65* (2018.01)
*G06F 9/54* (2006.01)

(52) U.S. Cl.
CPC .............. *G06F 21/572* (2013.01); *G06F 8/65* (2013.01); *G06F 9/547* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,002,871 A | 12/1999 | Duggan et al. | |
| 6,178,519 B1 * | 1/2001 | Tucker ................. | G06F 16/289 |
| | | | 707/999.01 |
| 6,772,107 B1 | 8/2004 | La Cascia, Jr. et al. | |
| 8,572,505 B2 | 10/2013 | Lee et al. | |
| 10,120,782 B2 | 11/2018 | Cohen | |
| 10,353,809 B2 | 7/2019 | Kshirsagar | |
| 10,437,712 B1 * | 10/2019 | Tyler ................... | G06F 11/3684 |
| 11,461,166 B2 | 10/2022 | R et al. | |

(Continued)

FOREIGN PATENT DOCUMENTS

| | | |
|---|---|---|
| CN | 113824764 A | 12/2021 |
| WO | 20230124241 A1 | 7/2023 |

*Primary Examiner* — Raqiul A Choudhury
(74) *Attorney, Agent, or Firm* — Leason Ellis LLP

(57) ABSTRACT

A method for automatically validating an application rollout that includes: receiving an indicator identifying a plurality of application servers associated with the application rollout; generating a simulated user input or an application programming interface (API) request corresponding to data related to the application rollout; transmitting the simulated user input or the API request to each of the plurality of application servers; receiving a response to the simulated user input and the API request from the each application server; identifying a status of the each application server based on the received response; and when the identified statuses for one or more of the plurality of application servers indicate an error that requested data related to the simulated user input or the API request is absent, transmitting a restart instruction to the one or more application servers.

20 Claims, 4 Drawing Sheets

(56)     References Cited

U.S. PATENT DOCUMENTS

| | | | |
|---|---|---|---|
| 11,494,203 B2 | 11/2022 | Cohen et al. | |
| 11,648,686 B2 | 5/2023 | Singh et al. | |
| 11,822,647 B1 * | 11/2023 | Tumblin | G06F 21/602 |
| 11,991,059 B1 * | 5/2024 | Gambhir | H04L 43/065 |
| 2003/0074606 A1 | 4/2003 | Boker | |
| 2005/0278274 A1 * | 12/2005 | Kovachka-Dimitrova | G06F 8/65 |
| 2006/0123414 A1 * | 6/2006 | Fors | G06F 8/61 |
| | | | 717/177 |
| 2018/0157550 A1 * | 6/2018 | Ivanov | H04L 41/122 |
| 2018/0322076 A1 | 11/2018 | Prasad et al. | |
| 2019/0303232 A1 | 10/2019 | Antonio et al. | |
| 2022/0342933 A1 * | 10/2022 | Lydick | G06F 16/2433 |
| 2023/0023382 A1 * | 1/2023 | Mani | G06F 9/542 |

* cited by examiner

400

METHOD AND APPARATUS FOR AUTOMATICALLY VALIDATING APPLICATION TRANSPORT ROLLOUTS

FIELD OF THE DISCLOSURE

The present disclosure generally relates to networked computing apparatuses and, more specifically, to a technique for automatically validating application transport rollouts to such networked computing apparatuses.

BACKGROUND OF THE DISCLOSURE

In networked computer systems, such as enterprise networks, clouding computing services, and the like, data and applications are often distributed among multiple networked computing apparatuses—e.g., application and data servers—for serving the stored data and/or applications to client devices, such as desktop computers, laptop computers, mobile devices, and the like.

To sustain such networks and/or services, new developments, periodic updates, maintenance tasks, and the like need to be deployed across the networked systems and computing apparatuses. For such developments, updates, and maintenance tasks, new information need to be communicated among the multiple networked computing apparatuses. In large-scale networked computer systems, there is a need to ensure that the deployment is successful across large numbers of computing apparatuses and to ensure that the corresponding new information is communicated to the appropriate targets. For large-scale networks and systems, such new information needs to be distributed amongst a large number of operating entities within the networks and systems.

SUMMARY OF THE DISCLOSURE

The present disclosure generally relates to a technique for ensuring that new information associated with maintaining a networked computer system is effectively communicated to the appropriate targets in the system.

For maintenance and performance testing in networked computer systems, there are existing methods for monitoring system performance, load testing and management, and conducting simulations to test performance. Some such methods include test environments for simulating user behavior, for example, to test software integration.

In view of the need to ensure new information, features, updates, and maintenance-related information is appropriately relayed to target computing apparatuses, the present disclosure is directed to an automatic process of simulating user access to networked computing apparatuses in an in-operation networked computer system for relevant data and/or application components associated with the updates and maintenance-related information. The returned information from networked computing apparatuses via the simulated user accesses would indicate whether or not the updates and maintenance-related information have been successfully integrated to the respective networked computing apparatuses. Accordingly, remedial actions can be timely and effectively deployed.

According to an example implementation consistent with the present disclosure, a system adapted to validate an application transport rollout comprises: a processor; a network interface to one or more networks; a non-transitory computer-readable memory operatively connected to the processor and having stored thereon machine-readable instructions that cause, when executed, the processor to: receive an indicator identifying a plurality of application servers associated with the application transport rollout; generate one or more of a simulated user input and an application programming interface (API) request corresponding to public data related to the application transport rollout; transmit, via the network interface, the generated one or more of the simulated user input and the API request to each of the plurality of application servers; receive, via the network interface, a response to the transmitted one or more of the simulated user input and the API request from each application server; identify a status of each application server based on the received response; and when the identified statuses for one or more of the plurality of application servers indicate an error that requested data related to the transmitted one or more of the simulated user input and the API request is absent, transmit, via the network interface, a restart instruction to the one or more application servers.

According to an example implementation, the received indicator is comprised in an application package of the application transport rollout.

According to an example implementation, the system further comprises machine-readable instructions stored on the non-transitory computer-readable memory that cause, when executed, the processor to: transmit, via the network interface, the application package to a designated primary application server among the plurality of application servers to execute the application transport rollout.

According to an example implementation, the one or more of the simulated user input and the API request are generated using robotic process automation (RPA).

According to an example implementation, the system further comprises machine-readable instructions stored on the non-transitory computer-readable memory that cause, when executed, the processor to: transmit an error message to an administrator device in the event that the identified statuses for one or more of the plurality of application servers indicate another error.

According to an example implementation, the system further comprises machine-readable readable instructions stored on the non-transitory computer-readable memory that cause, when executed, the processor to: repeat the steps of transmitting the generated one or more of the simulated user input and the API request, receiving the response, and identifying the status for each of the one or more application servers after transmitting the restart instruction.

According to an example implementation, the generated one or more of the simulated user input and the API request are transmitted to an application layer at the plurality of application servers and the restart instruction is transmitted to an operating system layer at the one or more of the application servers.

According to an example implementation, the restart instruction is transmitted to an operating system agent at each of the one or more application servers.

According to an example implementation, the system further comprises machine-readable instructions stored on the non-transitory computer-readable memory that cause, when executed, the processor to: transmit an error message to an administrator device in the event that the identified statuses for one or more of the plurality of application servers indicate the error that requested data related to the transmitted one or more of the simulated user input and the API request is absent.

According to an example implementation, the system further comprises machine-readable instructions stored on the non-transitory computer-readable memory that cause, when executed, the processor to: transmit a rollout success message to an administrator device in the event that the identified statuses for the plurality of application servers indicate successful responses.

According to an example implementation consistent with the present disclosure, a computer-implemented method for automatically validating an application transport rollout comprises: receiving an indicator identifying a plurality of application servers associated with the application transport rollout; generating one or more of a simulated user input and an application programming interface (API) request corresponding to public data related to the application transport rollout; transmitting the generated one or more of the simulated user input and the API request to each of the plurality of application servers; receiving a response to the transmitted one or more of the simulated user input and the API request from the each application server; identifying a status of the each application server based on the received response; and when the identified statuses for one or more of the plurality of application servers indicate an error that requested data related to the transmitted one or more of the simulated user input and the API request is absent, transmitting a restart instruction to the one or more application servers.

According to an example implementation, the received indicator is comprised in an application package of the application transport rollout.

According to an example implementation, the method further comprises: transmitting the application package to a designated primary application server among the plurality of application servers to execute the application transport rollout.

According to an example implementation, the one or more of the simulated user input and the API request are generated using robotic process automation (RPA).

According to an example implementation, the method further comprises: when the identified statuses for one or more of the plurality of application servers indicate another error, transmitting an error message to an administrator device.

According to an example implementation, the method further comprises: after transmitting the restart instruction, repeating the steps of transmitting the generated one or more of the simulated user input and the API request, receiving the response, and identifying the status for each of the one or more application servers.

According to an example implementation, the generated one or more of the simulated user input and the API request are transmitted to an application layer at the plurality of application servers and the restart instruction is transmitted to an operating system layer at the one or more of the application servers.

According to an example implementation, the restart instruction is transmitted to an operating system agent at each of the one or more application servers.

According to an example implementation, the method further comprises: when the identified statuses for one or more of the plurality of application servers indicate the error that requested data related to the transmitted one or more of the simulated user input and the API request is absent, transmitting an error message to an administrator device.

According to an example implementation, the method further comprises: when the identified statuses for the plurality of application servers indicate successful responses, transmitting a rollout success message to an administrator device.

According to an example implementation consistent with the present disclosure, a system adapted to validate an application rollout comprises: a processor; a network interface to one or more networks; a non-transitory computer-readable memory operatively connected to the processor and having stored thereon machine-readable instructions that cause, when executed, the processor to: receive an indicator identifying a plurality of application servers associated with the application rollout; generate a simulated user input or an application programming interface (API) request corresponding to data related to the application rollout; transmit the simulated user input or the API request to each of the plurality of application servers; receive a response to the simulated user input and the API request from the each application server; identify a status of the each application server based on the received response; and when the identified statuses for one or more of the plurality of application servers indicate an error that requested data related to the simulated user input or the API request is absent, transmit a restart instruction to the one or more application servers.

According to an example implementation consistent with the present disclosure, a method for automatically validating an application rollout comprises: receiving an indicator identifying a plurality of application servers associated with the application rollout; generating a simulated user input or an application programming interface (API) request corresponding to data related to the application rollout; transmitting the simulated user input or the API request to each of the plurality of application servers; receiving a response to the simulated user input and the API request from the each application server; identifying a status of the each application server based on the received response; and when the identified statuses for one or more of the plurality of application servers indicate an error that requested data related to the simulated user input or the API request is absent, transmitting a restart instruction to the one or more application servers.

BRIEF DESCRIPTION OF THE DRAWING FIGURES

Various example implementations of this disclosure will be described in detail, with reference to the following figures, wherein:

FIG. 1 is a schematic illustration of a deployment system 101 executing a deployment process 100 in correspondence with a networked computer system 120 according to an example implementation of the present disclosure.

DETAILED DESCRIPTION OF CERTAIN EMBODIMENTS OF THE DISCLOSURE

As an overview, the present disclosure generally concerns maintaining and updating networked computer systems and is directed to a technique for automatically validating application transport rollouts to networked computing apparatuses within such systems. The technique disclosed in the present disclosure is especially advantageous for maintaining large scale systems to ensure proper distribution of updated information while minimizing maintenance downtime and resources required for the validation.

As used throughout this application, the words "system" and "server" can be used interchangeably with "device," "apparatus," and "network," respectively, where a system or server can be embodied by a singular apparatus, device, and the like, and be comprised in or comprise a computer-implemented network of plural entities, apparatuses, devices, etc.

Figure 1:
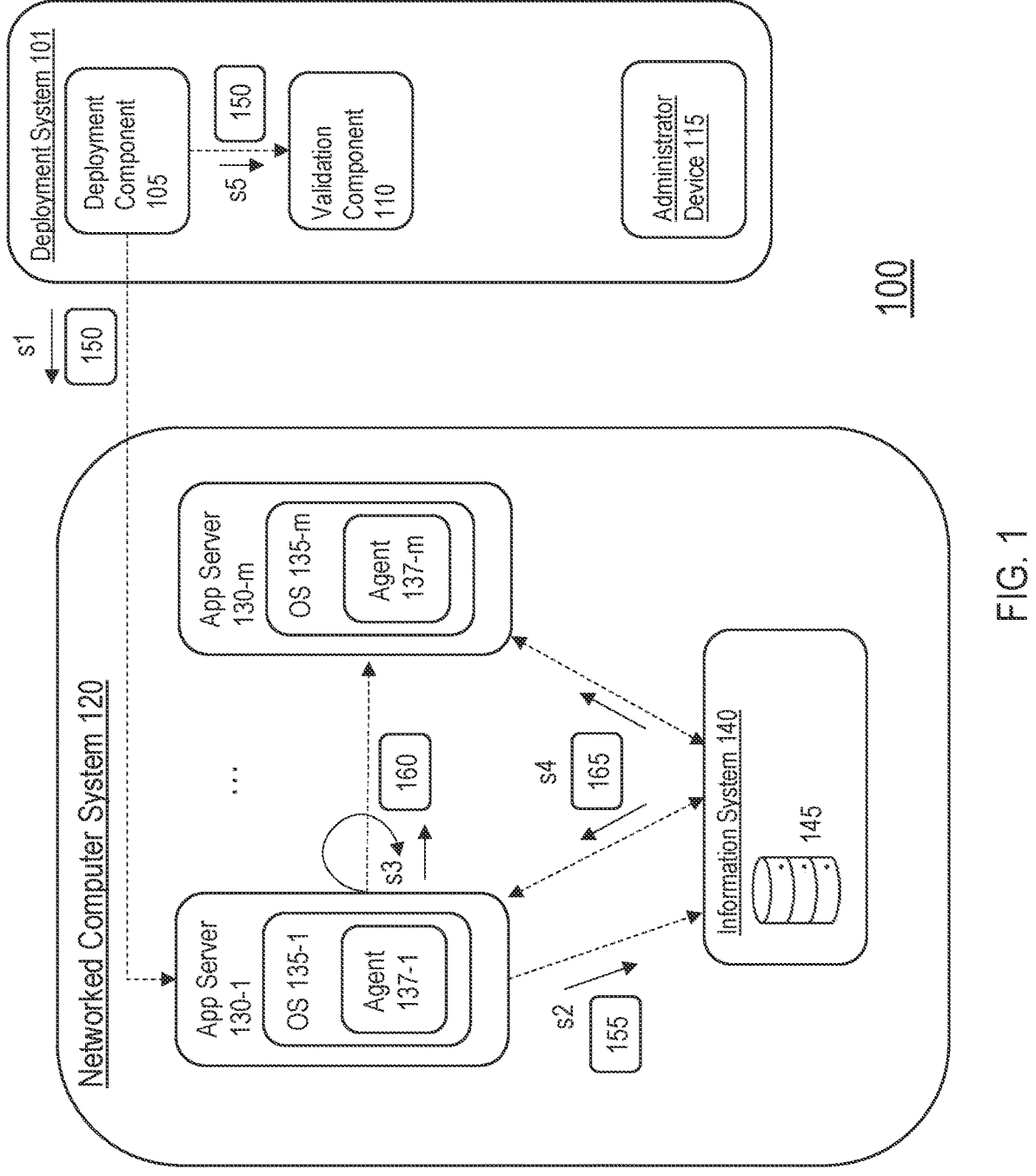

FIG. 1 is a schematic illustration of a deployment system 101 executing a deployment process 100 in correspondence with a networked computer system 120 according to an example implementation of the present disclosure. It should be understood by one of ordinary skill in the art that one or more of the devices, apparatuses, components, servers, systems, and entities shown in the drawing figures, and as described below, can be divided into respective plural entities. Conversely, the features and functionality provided by any plural entities in the drawing figures, and as described below, can be provided by a consolidated apparatus with suitable programming and/or attendant hardware components to provide such features and functionality.

Deployment system 101 is adapted to maintain a networked computer system 120 in accordance with one example implementation of the present disclosure. According to the example implementation, deployment system 101 includes a deployment component 105, a validation component 110, and an administrator device 115. Components 105, 110, and 115 are identified as parts of deployment system 101 but each can be an independent operating hardware and/or software entity according to various implementations of the present disclosure without departing from its spirit and scope.

In one implementation, networked computer system 120 includes a plurality of application servers (app servers) 130-1, . . . , 130-$m$ (m>1) and one or more information systems 140 (one shown). Each application server 130-1 . . . 103-$m$ includes a corresponding operating system (OS) 135-1 . . . 135-$m$ and an agent 137-1 . . . 137-$m$ that is operating or executable at the respective OS 135-1 . . . 135-$m$.

Information system 140 incorporates one or more database servers 145 that operate to serve stored data for app servers 130 and computing devices (not shown) that interact with app servers 130 and/or information system 140 directly.

As illustrated in FIG. 1, deployment component 105 is in communication with at least one of the app servers 130-1, which, according to one example implementation of the present disclosure, serves as a primary app server for implementing an application and/or data deployment to system 120. According to one example implementation, deployment component 105 includes a Change and Transport System (CTS) for a corresponding SAP® System included in networked computer system 120, which can include one or more Java® system components and/or an overall Java-based system. In embodiments, deployment component 105 can be associated with one or more of a development system (not shown) and a test system (not shown) that are used, respectively, for developments and testing of operational processes and applications to be deployed on networked computer system 120, which can be termed a productive system.

As shown in FIG. 1, at a step s1 of deployment (or rollout) process 100, the CTS of component 105 delivers an application (and/or data) package 150 to a specific system—such as one or more applications, features, components, underlying data, and the like—of system 120. The CTS of component 105 ensures the delivery of the package 150 to at least the primary app server 130-1 of the targeted system 120—for example, by also forwarding details (not shown), such as a checksum or the like, of package 150 to server 130-1 of the targeted system 120. In embodiments, the details (not shown) related to package 150 can be embedded or appended to package 150 or can be separately transmitted from component 105 to app server 130-1. Upon a successful delivery of the package 150, for example by confirming a checksum, app server 130-1, at a step s2 of deployment process 100, commits changes from package 150 to information system 140 in the form of one or more change messages 155. As an example, updated information and/or changes relevant to one or more databases (not shown) that are maintained at information system 140 are embodied in one or more change messages 155 transmitted from app server 130-1 to information system 140. In embodiments, package 150 can be forwarded to information system 140 for processing any changes included in package 150 that are associated with the database(s) maintained at information system 140.

Next, at step s3, app server 130-1, which serves as the primary app server for application package 150, triggers itself and other application servers (e.g., 130-$m$) in the system 120 to reference new data and/or conduct new process executions associated with new data included in package 150 that are now committed to information system 140. It is noted that any of app servers 130 (130-1 . . . 130-$m$) can serve as a primary app server for a particular application and/or an application (150), package which can include a new feature/component/interface/application package, a maintenance task related package, an update package, and the like. According to one example implementation, the new reference trigger is an update message 160 that includes information relating to new package 150 and corresponding one or more application and/or data-related packages that have been created, overwritten, updated, amended, or the like. Upon receiving an update message 160, each of the app servers 130 that are associated with the application and/or data that has been affected by package 150 delete any existing versions of the one or more application and/or data-related packages that are to be overwritten, updated, amended, or the like.

As illustrated in FIG. 1, deployment process 100 next proceeds to step s4, where each of the app servers 130 that are associated with the application and/or data that has been affected by package 150—and, accordingly, notified by update message 160—retrieves a new package 165 from information 140, which would replace any existing versions that are deleted at step s3.

As illustrated in FIG. 1, in embodiments, multiple application servers 130 can correspond to one dedicated server—for example, database server 145—for a database maintained at information system 140. In such circumstances, there is a possibility that one or more of application servers 130 would be disconnected from database server 145 due to a network glitch, a node hanging due to memory overflow, an unexpected error, or other technological behaviors in a large scale network. Thus, for example, at step s4, a rollout of the new package 165 on one or more of application servers 130-1 . . . 130-$m$ can be affected. It is recognized that such a rollout failure can cause an application to be unavailable on one or more of application servers 130, which can risk slowing/hindering underlying processes associated with the updated application package 165.

Thus, according to an example implementation of the present disclosure, deployment process 100 further includes a step s5, where deployment component 105 informs validation component 110 of a deployment of package 150 to thereby trigger a validation process 200 of the deployment. According to one implementation, step s5 includes deployment component 105 forwarding package 150, and/or details thereof in, for example, an indicator message (not shown) or the like, to validation component 110 for identifying the relevant application servers 130 that are expected to be affected by the package deployment. In embodiments, step s5 can also include one or more of primary application server 130-1, application servers 130, and information system 140 forwarding the corresponding messages/packages 155, 160, and 165 to validation component 110. In embodiments, steps s5 and s1 can be integrated so that validation component 110 receives package 150 as part of an application transport rollout. Accordingly, validation component 110 determines the relevant applications servers 130 that are involved with the deployment of package 150 and performs validation process 200.

Figure 2:
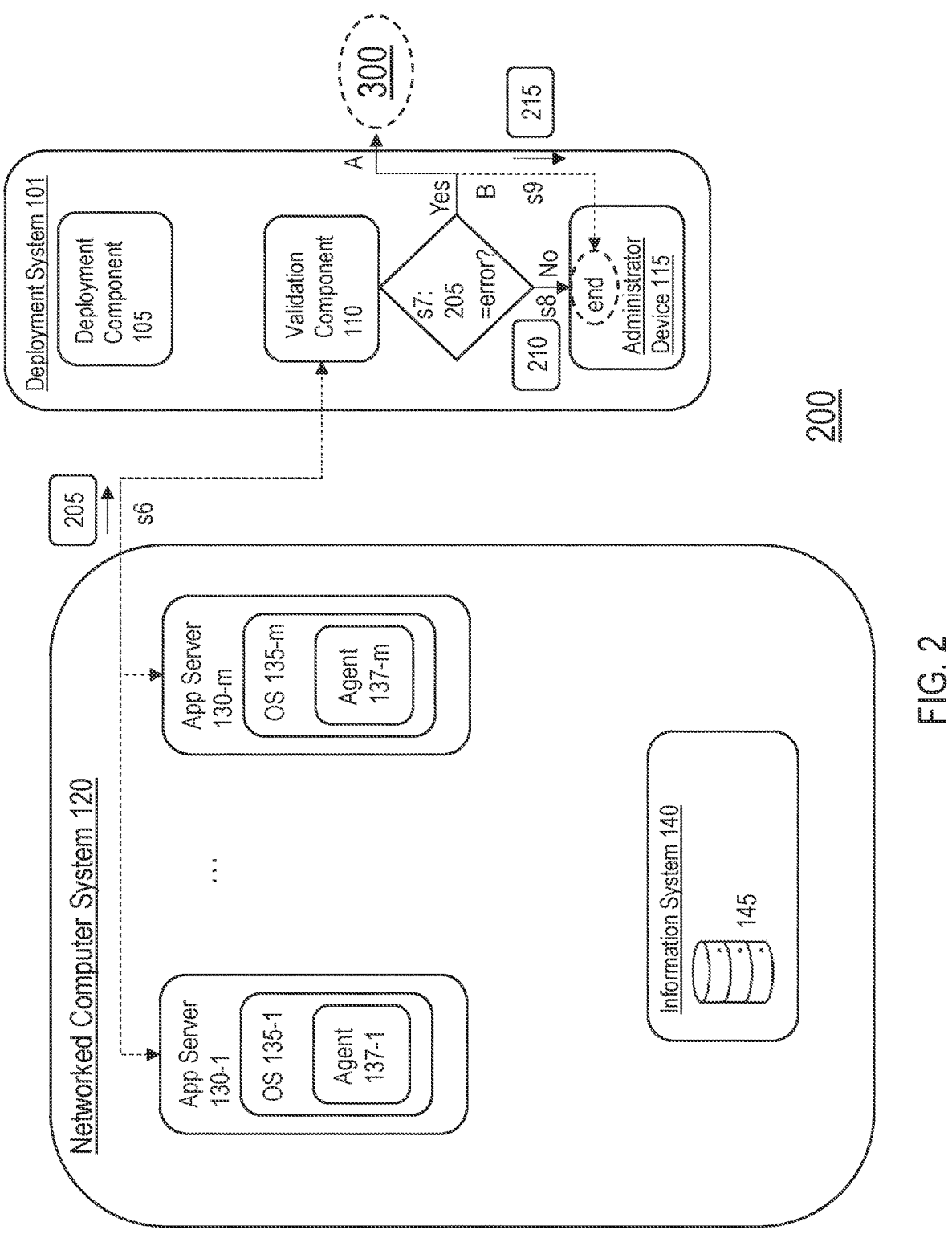
FIG. 2 is a schematic illustration of the deployment system of FIG. 1 executing a deployment validation process in continuation from the deployment process of FIG. 1 in accordance with an example implementation of the present disclosure.

FIG. 2 is a schematic illustration of deployment system 101 executing a deployment validation process 200 in continuation from deployment process 100 in accordance with an example implementation of the present disclosure.

As illustrated in FIG. 2, process 200 initiates in continuation from step s5 of process 100 with step s6 of validation component 110 communicating with each of application servers 130-1 . . . 130-m to retrieve data 205 associated with update package 150, which is originally communicated to primary application server 130-1 in process 100, and new data package 165 for implementing the update to all related application servers 130-1 . . . 130-m from information system 140.

According to one example implementation, validation component 110 includes a robotic process automation (RPA) framework that simulates end user activity at step s6 to validate the success of package rollout across all application servers 130-1 . . . 130-m. In embodiments, the RPA can be an unattended RPA solution from the server side. For example, at least a portion of validation component 110 can be implemented by one or more computing (e.g., server) apparatuses (sec 410 in FIG. 4) associated with networked computer system 120. In embodiments, some or all of the components and functionality of deployment system 101 can be implemented by such apparatuses associated with networked computer system 120 or by another computer network. According to one example implementation, an SAP® Java System is in operation at networked computer system 120 and the RPA framework, which is programmed using python or the like, simulates user interactions with the system 120 after deployment process 100. The simulated user interactions utilize human interaction simulation methods or Application Programming Interface (API) calls to the targeted system—e.g., application servers 130-1 . . . 130-m. In embodiments, the human interaction simulation methods can include one or more of application and/or feature execution(s), data retrieval(s), navigation step(s), user interface input(s), and API call(s).

According to one example implementation, the simulated user interactions include at least one simulated user input that targets application public content, such as an image, at each identified application server 130 associated with package 150 that does not require authentication for access or to connect through an API. As an example, data and content related to package 150 that is flagged as public or that is not flagged as private can be targeted by the simulated user interactions. Thus, the present disclosure provides for testing system availability by making requests to certain accessible component(s) on system 120 without the need for an authentication mechanism. Accordingly, no authenticated virtual users are needed for implementing the simulated user interactions. In alternative embodiments, when all content is private, an authentication mechanism can be implemented, such as certificate-based authentication—for example, .x509 and the like.

Next, at step s7, validation component 110 evaluates the returned data 205 from each of the application servers 130-1 . . . 130-m with which validation component 110 interacted at step s6. In one embodiment, validation component 110 determines whether returned data 205 from each server 130 indicates an error state—for example, whether returned data 205 includes an error status code. In accordance with one example implementation, the simulated user interaction at step s6 includes a data request in the Hypertext Transfer Protocol (HTTP) (or Hypertext Transfer Protocol Secure (HTTPS)). Accordingly, returned data 205 in such an implementation includes a standardized HTTP status code, which indicates the following responses:

a. Informational responses (100-199)
    b. Successful responses (200-299)
    c. Redirection messages (300-399)
    d. Client error responses (400-499)
    e. Server error responses (500-599)

In other implementations, status codes can be returned using alternative protocols.

When validation component 110 determines that the returned data 205 from the applications servers 130 includes only successful responses ("No" errors) (for example, HTTP status code 200), process 200 proceeds to step s8, where a deployment (or rollout) success message 210 is forwarded to administrator device 115. In embodiments, deployment success message can be an application message in a deployment application program executing at the administrator device 115, an email message, a Short Message/Messaging Service (SMS) message, a notification message, or the like. As an example, message 210 can be embodied in an email deployment report.

When validation component 110 determines that one or more of application servers 130-1 . . . 130-m has returned an error status code ("Yes" errors), a determination is made on the particular error status and process 200 proceeds according to the determined error status.

When one or more of applications servers 130-1 . . . 130-m return an error status indicating that the data requested or retrieved at step s6 cannot be found (error "A") (for example, HTTP status code 404), process 200 proceeds to a remediation process 300 with respect to the one or more applications servers 130-1 . . . 130-m that are identified as having returned such an error status. In an example implementation, error "A" indicates an absence of requested data when accessing an application through simulated inputs (e.g., clicks) or API call(s) at step s6. For example, a HTTP 404 "Not Found" status code indicates that the server (130) cannot find a requested resource. In an API, this can also mean that the endpoint is valid but the resource itself does not exist (e.g., at application server(s) 130). As noted, networked computer system 120 can comprise multiple application servers 130 running on different machines, and there can be a dedicated server 145 for a database associated with an application. Consequently, there is a possibility that one or more application servers 130-1 . . . 130-*m* lose a connection to the database due to network glitch, node hanging due to memory overflow, or technology behavior, which prevents the rollout (process 100) of the new package 150 on the one or more application servers 130. An error "A" returned at step s7 would indicate that the application and/or data associated with package 150 is unavailable on the one or more application servers 130. Advantageously, the automatic simulated user interactions of the present disclosure immediately identify any impacted application servers 130 upon completion of a package deployment (process 100). Otherwise, identifying any such impacted servers 130 would be difficult and would require substantial human administration resources, especially in large scale networks.

When one or more application servers 130-1 . . . 130-*m* return another error status (error "B") (for example, HTTP status code 401 or 500), process 200 proceeds to step s9, where an error message 215 identifying the one or more application servers 130-1 . . . 130-*m* that returned the error status is transmitted to administrator device 115. A HTTP 401 "Unauthorized" status codes indicates that a client (e.g., an end user device or, in process 200, validation component 110) is "unauthenticated." In other words, the client must authenticate itself to get the requested response. A HTTP 500 "Internal Server Error" indicates a situation that the server (130) is unable to independently resolve. Thus, an error "B" returned at step s7 would indicate an error that may require immediate administrator attention, where the cause of the error can stem from beyond a network error suffered by an individual server (130) during the rollout process 100.

Error message 215 can be an application message in a deployment application program executing at the administrator device 115, an email message, an SMS message, a notification message, or the like. As an example, message 215 can be embodied in an email deployment report. In embodiments, error message 215 can include the identification(s), corresponding error status(es), and the like, returned at step s7.

As with error "A," the automatic simulated user interactions of the present disclosure, advantageously, identify any impacted application servers 130 upon completion of a package deployment. Thus, the present disclosure provides for an automatic and immediate diagnosis of deployment-related errors and other kinds of errors of an in-operation and deployed application package 150 from an end user perspective by simulating user interactions with networked computer system 120, which diagnosis is triggered by the deployment action. In other words, the present disclosure provides for availability testing in a productive environment with a remediation option based on the test results.

As illustrated in FIG. 2, the Deployment and Validation processes 100 and 200 conclude after step s8 or s9 according to one example implementation of the present disclosure. In embodiments, validation process 200 can include a return to step s6 to conduct another user interaction simulation for validating any remedial actions taken after step s9.

Figure 3:
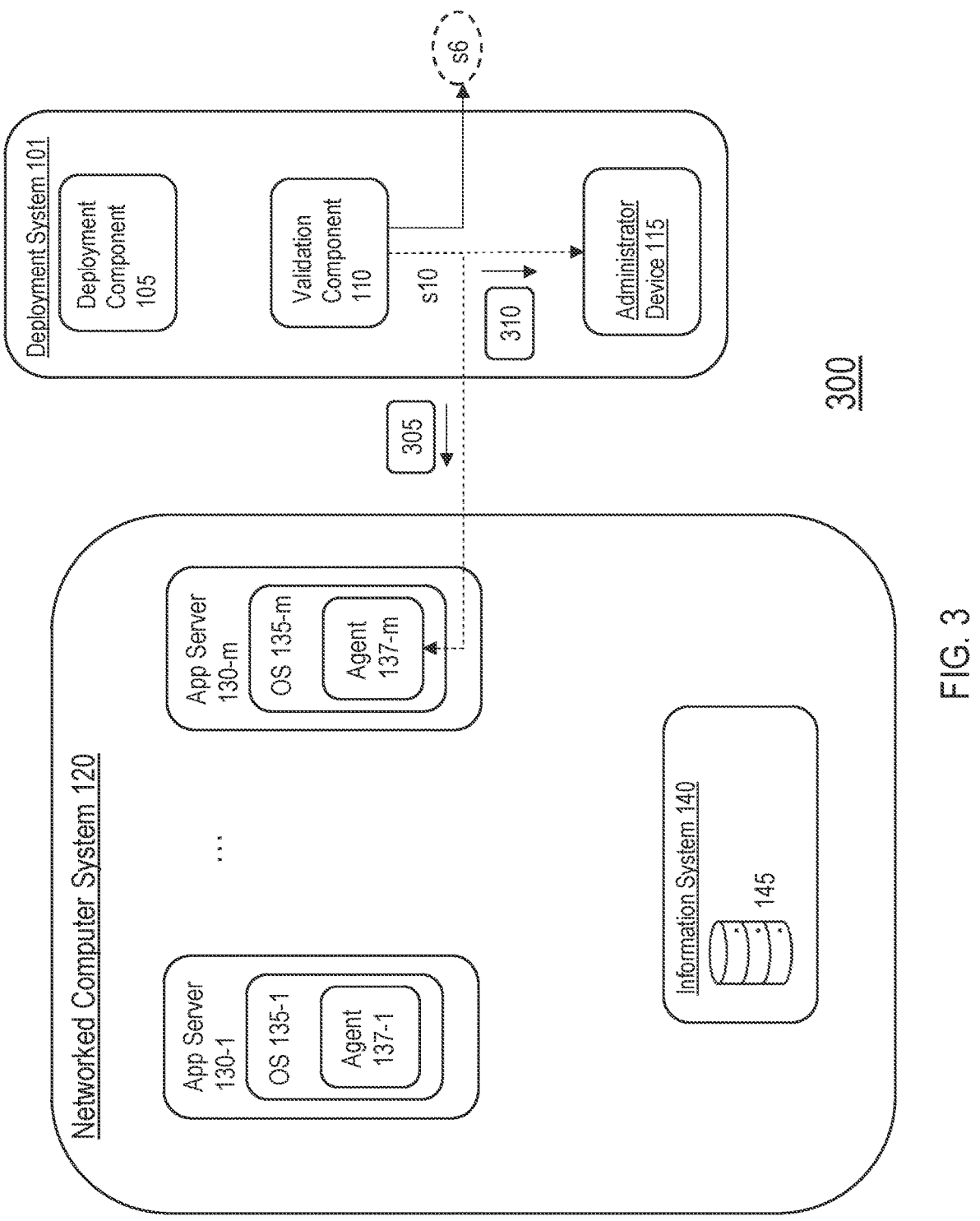
FIG. 3 is a schematic illustration of deployment system of FIG. 1 executing an automatic remediation process in continuation from the validation process of FIG. 2 in accordance with an example implementation of the present disclosure.

FIG. 3 is a schematic illustration of deployment system 101 executing an automatic remediation process 300 in continuation from validation process 200 in accordance with an example implementation of the present disclosure.

When validation component 110 (e.g., RPA program) finds one or more application servers 130 returning a HTTP 404 status code (error "A" at step 7) from accessing a corresponding application (e.g., through clicks or API), remediation process 300 initiates with step s10 of connecting to an agent 137 deployed on the operating system layer of OS 135 on the application server 130 that has returned an error "A" at step s6. FIG. 3 illustrates an example where application server 130-*m*, and not application server 130-1, has returned an error "A." Thus, as shown in FIG. 3, validation component 110 connects to agent 137-*m* and issues an instruction 305 to trigger a restart function of OS 135-*m* to restart impacted application server 130-*m*. According to one example implementation, validation component 110 conducts the connectivity with agent 137(-*m*) of step s10 on the operating system layer and the application access mechanism of step s6 on the Application Server layer, for example, the application layer (not shown) deployed on top of the OS 135(-1 . . . -*m*). In embodiments, agent 137 can be hosted anywhere as long as network connectivity is available to the application server 130 being triggered for restart. In other words, one or more of agents 137-1 . . . 137-*m* can reside on the same or different apparatuses corresponding to applications servers 130-1 . . . 130-*m* and step s10 can be conducted such that the agent 137-1 . . . 137-*m* triggers a restart at OS 135-1 . . . 135-*m* via a network communication.

In accordance with one example implementation, at step s10, validation component 110 also transmits a notification message 310 identifying the one or more application servers 130(-*m*) that returned the error status "A" to administrator device 115. Notification message 310 can be an application message in a deployment application program executing at the administrator device 115, an email message, an SMS message, a notification message, or the like. As an example, message 310 can be embodied in an email deployment report. In embodiments, error message 310 can include the identification(s), corresponding error status(es), returned at step s7, as well as remediation status, and the like.

With a restart of the server 130(-*m*), it can repeat step s4 of deployment process 100 of updating with package 165. For anomalous network errors that could have caused the initial error "A," a likelihood of a same anomalous network error repeating is substantially low.

Next, validation component 110 returns to step s6 of validation process 200 at least with respect to the restarted server 130(-*m*), where simulated user interactions are automatically executed to confirm successful deployment of package 165 (or package 150). In accordance with one example implementation, validation component 110 incorporates a counter (not shown) for automatic remediations with a pause threshold (e.g., >=2) for pausing remediation process 300 if multiple "A" errors are returned from a particular server 130 after more than one restart cycle. Thus, an administrator can intervene in such circumstances.

Advantageously, the present disclosure provides for a deployment validation technique in a productive environment that can operate independently and in addition to existing system performance monitoring and pre-deployment testing processes. The disclosed technique, thus, does not incorporate additional system operation error messages or logs in a networked computer system (120) and does not add to existing error logging mechanisms that can increase the human administration resources needed to maintain the system (120). Accordingly, the present disclosure provides a technical solution to a specific deployment error scenario using an automatic mechanism for immediate post-deployment detection and remediation that has low resource requirements.

Figure 4:
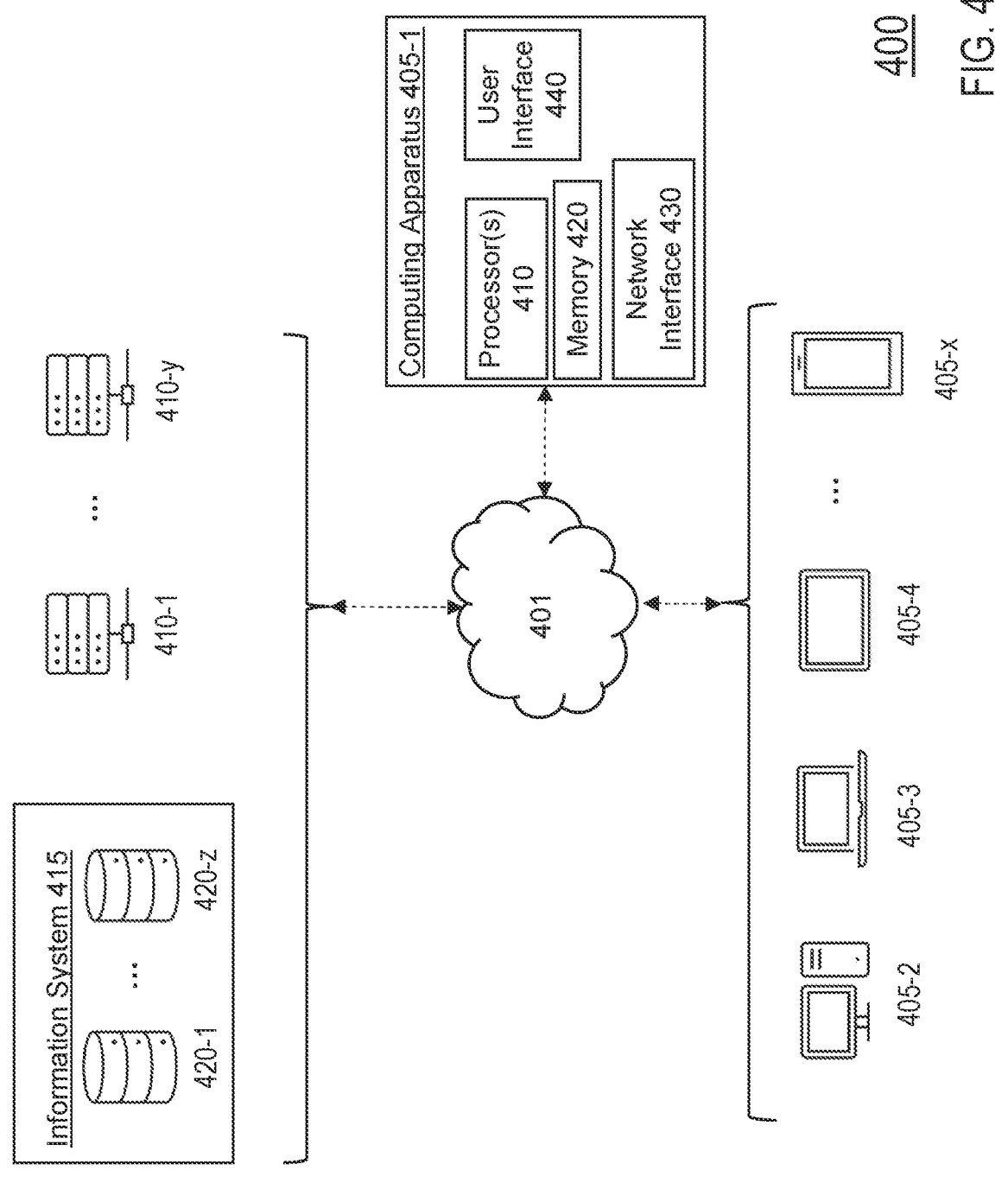
FIG. 4 is a schematic illustration of a network system for implementing the deployment system, networked computer system, and processes 100, 200, 300 of FIGS. 1-3 according to an example embodiment of the present disclosure.

FIG. 4 is a schematic illustration of a network system 400 corresponding to deployment system 101, networked computer system 120, and processes 100, 200, 300, illustrated in FIGS. 1-3 according to an example implementation of the present disclosure. It should be understood by one or ordinary skill in the art that one or more of the devices, apparatuses, and systems shown in FIG. 4, and as described below, can be divided into plural entities. Conversely, the features and functionality provided by any plural entities shown in FIG. 4, and as described below, can be provided by a consolidated apparatus with suitable programming and attendant hardware components to provide such features and functionality. As an example, one or more of application servers 130 illustrated in FIGS. 1-3 can be incorporated in respective server apparatuses (e.g., 410) by direct correspondence and/or in a different number of said server apparatus(es) 410 by virtualization.

As shown in FIG. 4, system 400 includes a network 401, computing apparatuses 405-1 . . . 405-x (x>1), computing (e.g., server) apparatuses 410-1 . . . 410-y (y>1), and an information system 415. According to an example implementation, apparatuses 405, 410, and information system 415 are communicatively connected to one another via network 401. As can be appreciated by one of ordinary skill in the art, the arrangement and number of computing apparatuses 405-1 . . . 405-x, server apparatuses 410-1 . . . 410-y, and information system 415 can be adjusted based on the needs of a particular networked computer system—e.g., system 120.

In embodiments, system 400 can incorporate an enterprise network that is associated with an enterprise organization, a cloud computing service platform, or the like. Accordingly, network 401 is comprised of switches (not shown), routers (not shown), and other computing devices (not shown) for facilitating communications and data exchanges among servers, such as apparatuses 410 and information system 415, and clients, such as computing apparatuses 405, while conforming to various connections and protocols as understood by those of ordinary skill in the art.

In embodiments, network(s) 120 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that can be used to facilitate communications among apparatuses 405, 410, and information system 415. Various additional communication protocols can be used to facilitate communications of the apparatuses, including the following non-exhaustive list, Wi-Fi (e.g., 802.11 protocol), Bluetooth, radio frequency systems (e.g., 900 MHZ, 1.4 GHz, and 5.6 GHz communication systems), cellular networks, FTP, RTP, RTSP, SSH, to name a few.

Communications systems for facilitating network 401 can include hardware (e.g., hardware for wired and/or wireless connections) and/or software. In implementations, communications systems can include one or more communications chipsets, such as a GSM chipset, CDMA chipset, LTE chipset, 4G/5G/6G, Wi-Fi chipset, Bluetooth chipset, to name a few, and/or combinations thereof. Wired connections can be adapted for use with cable, plain old telephone service (POTS) (telephone), fiber (such as Hybrid Fiber Coaxial), xDSL, to name a few, and wired connections can use coaxial cable, fiber, copper wire (such as twisted pair copper wire), and/or combinations thereof, to name a few. Wired connections can be provided through telephone ports, Ethernet ports, universal serial bus ("USB") ports, and/or other data ports, such as Apple 30-pin connector ports, Apple Lightning or Thunderbolt connector ports, to name a few. Wireless connections can include cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, LTE, 5G, and/or 6G to name a few), Bluetooth, Bluetooth Low Energy, Wi-Fi, radio, satellite, infrared connections, ZigBee communication protocols, to name a few. Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few.

Computer systems—apparatuses 405, 410 and information system 415—can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few.

In embodiments, network 401 can be embodied by one or more private shared IP networks, corporate shared packet networks, Storage Area Networks (SAN), and/or dedicated communications conduits or circuits based on dedicated channels, such as Synchronous Digital Hierarchy (SDH), Synchronous Optical Networking SONET, Wave Division Multiplexing, dedicated cable, Digital Subscriber Line (DSL), dedicated fiber, or various forms of other non-shared IP packet networks as understood by those of ordinary skill in the art.

As can be understood by one of ordinary skill in the art, computer systems—apparatuses 405, 410 and information system 415—capable of embodying the systems and/or methods described herein—for example, deployment system 101, networked computer system 120, and information system 140—can include any suitable type of electronic device including, but not limited to, workstations, servers, desktop computers, mobile computers (e.g., laptops, ultrabooks), mobile phones, portable computing devices, such as smart phones, tablets, personal display devices, personal digital assistants ("PDAs"), virtual reality devices, wearable devices (e.g., watches), to name a few. As can be appreciated by one of ordinary skill in the art, the features and functions described herein of deployment system 101, networked computer system 120, and information system 140 can be performed interchangeably among these entities without departing from the spirit and scope of the present disclosure.

Computing apparatus 405-1 is a representative illustration of the fundamental schematics of such computer systems. As illustrated in FIG. 4, computing apparatus 405-1 incorporates one or more processor devices 410, a memory 420, a network interface 430, and a user interface 440.

According to one example implementation, computing apparatus 405-1 embodies an administrator device 115 that programmatically controls one or more of apparatuses 410-1 . . . 410-y and information system 415 to execute the features of deployment system 101 and networked computer system 120 shown in FIGS. 1-3. Thus, as described before, administrator device 115 can be incorporated in deployment system 101 or operate externally from system 101.

Computing apparatuses 405-2 . . . 405-x illustrate various types of devices that are usable to access system 400 by respective end users. For enterprise networks, one or more of computing apparatuses 405-1 . . . 405-x can access network 401 via a virtual private network ("VPN") tunnel through an external network (not shown). Such tunnels can employ Layer 2 Tunneling Protocol (L2TP) and the like.

Returning to FIG. 4, one or more processor(s) 410 can include any suitable processing circuitry capable of controlling operations and functionality of computing apparatus 405-1, as well as facilitating communications between various components within computing apparatus 405-1. In some implementations, processor(s) 410 can include a central processing unit ("CPU"), a graphic processing unit ("GPU"), one or more microprocessors, a digital signal processor, or any other type of processor, or any combination thereof. In some implementations, the functionality of processor(s) 110 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 410 can include its own local memory, which can store program systems, program data, and/or one or more operating systems.

Memory 420 can include one or more types of storage mediums such as any volatile or non-volatile memory, or any removable or non-removable memory implemented in any suitable manner to store data for computing apparatus 405-1. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 115 can be implemented as computer-readable storage media ("CRSM"), which can be any available physical media accessible by processor(s) 410 to execute one or more instructions stored within memory 420. In some implementations, one or more applications can be run by processor(s) 410 and can be stored in memory 420.

Network interface 430 can include any circuitry allowing or enabling one or more components of computing apparatus 405-1 to communicate with one or more additional devices, servers, and/or systems—for example, one or more of computing apparatuses 405-2 . . . 405-x, 410, and information system 415—via network 401 using any number of communications protocols, including any of the previously mentioned example communications protocols. In embodiments, network interface 430 can include one or more USB ports, one or more Ethernet or broadband ports, and/or any other type of hardwire access port to communicate with network 401 and, accordingly, computing apparatuses 405-2 . . . 405-x, 410, and information system 415.

Thus, computing apparatuses 405-2 . . . 405-x with fundamental schematics that conform to those of computing apparatus 405-1 are usable by end users to access system 400. In one example implementation, networked computer system 120 is implemented by computing apparatuses 410-1 . . . 410-y that also conform to the fundamental schematics of computing apparatus 405-1.

As would be appreciated by one of ordinary skill in the art, any one or more of apparatuses 410-1 . . . 410-y can forego onboard user interfaces and be programmatically controlled by another apparatuses, such as computing apparatus 405-1. As described before, one or more of apparatuses 410 can perform the features of deployment system 101 and networked computer system 120, respectively. As an example, application server(s) 130 can be incorporated in respective computing apparatuses 410 adapted to host one or more applications that are accessible and executable over network 401 by authorized users at computing apparatuses 405-1 . . . 405-x. In embodiments, executable portions of applications maintained at application server(s) 130 can be offloaded to computing apparatuses 405.

With reference to process 200 shown in FIG. 2, simulated user interactions of step s6 simulate end user interactions from one or more of computing apparatuses 405 via network 401 with one or more applications executed at computing apparatus(es) 410, which perform the features of application server(s) 130. The simulated user interactions target data, feature(s), and/or application(s), etc., associated with a deployed package 150. Additionally, as described before, according to one example implementation, the simulated user interactions of step s6 involve at least some data that does not require authorization for access. Accordingly, such simulated user interactions can forego a requirement to create authenticated virtual users for the deployment validation process of the present disclosure.

Information system 415 incorporates data storage 420-1 . . . 420-z (z>1) that embodies storage media for storing data corresponding to one or more applications executed at computing apparatuses 410. In one example implementation, information system 415 performs the features of information system 140 in processes 100, 200, and 300 shown in FIGS. 1-3 and database 145 is stored in one or more of data storage 420. Example storage media for data storage 420 correspond to those described above with respect to memory 420 and will not be repeated. In example implementations, information system 415 incorporates one or more database servers that support Oracle SQL, NoSQL, NewSQL, PostgreSQL, MySQL, Microsoft SQL Server, Sybase ASE, SAP HANA, DB2, and the like. Information system 415 incorporates a communication interface (not shown) for communications with the aforementioned entities—i.e., computing apparatuses 405 and 410—and example implementations of which can include those described above with respect to network interface 430.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-b). Description of elements with references to the base reference numerals (e.g., 210) also refer to all specific examples with such letter suffixes (e.g., 210-b), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A system adapted to validate an application transport rollout, comprising:
a processor,
a network interface to one or more networks;
a non-transitory computer-readable memory operatively connected to the processor and having stored thereon machine-readable instructions that cause, when executed, the processor to:
receive an indicator identifying a plurality of application servers associated with the application transport rollout;

generate one or more of a simulated user input and an application programming interface (API) request corresponding to public data related to the application transport rollout;
transmit, via the network interface, the generated one or more of the simulated user input and the API request to each of the plurality of application servers;
receive, via the network interface, a response to the transmitted one or more of the simulated user input and the API request from each application server;
identify a status of each application server based on the received response; and
when the identified status for one or more of the plurality of application servers indicates an error that requested data related to the transmitted one or more of the simulated user input and the API request is absent, transmit, via the network interface, a restart instruction to the one or more application servers without transmitting any instructions to an application layer of the one or more application servers.

2. The system of claim 1, wherein the received indicator is comprised in an application package of the application transport rollout.

3. The system of claim 2, further comprising machine-readable instructions stored on the non-transitory computer-readable memory that cause, when executed, the processor to:
transmit, via the network interface, the application package to a designated primary application server among the plurality of application servers to execute the application transport rollout.

4. The system of claim 1, wherein the one or more of the simulated user input and the API request are generated using robotic process automation (RPA).

5. The system of claim 1, further comprising machine-readable instructions stored on the non-transitory computer-readable memory that cause, when executed, the processor to:
transmit an error message to an administrator device in the event that the identified status for another one or more of the plurality of application servers indicates another error.

6. The system of claim 1, further comprising machine-readable instructions stored on the non-transitory computer-readable memory that cause, when executed, the processor to:
repeat the steps of transmitting the generated one or more of the simulated user input and the API request, receiving the response, and identifying the status for each of the one or more application servers after transmitting the restart instruction.

7. The system of claim 1, wherein the generated one or more of the simulated user input and the API request are transmitted to an application layer at the plurality of application servers and the restart instruction is transmitted to an operating system layer at the one or more of the application servers.

8. The system of claim 1, further comprising machine-readable instructions stored on the non-transitory computer-readable memory that cause, when executed, the processor to:
transmit an error message to an administrator device in the event that the identified status for one or more of the plurality of application servers indicates the error that requested data related to the transmitted one or more of the simulated user input and the API request is absent.

9. The system of claim 1, further comprising machine-readable instructions stored on the non-transitory computer-readable memory that cause, when executed, the processor to:

transmit a rollout success message to an administrator device in the event that the identified status for each of the plurality of application servers indicates a successful response.

10. A system adapted to validate an application transport rollout, comprising:

a processor;

a network interface to one or more networks;

a non-transitory computer-readable memory operatively connected to the processor and having stored thereon machine-readable instructions that cause, when executed, the processor to:

receive an indicator identifying a plurality of application servers associated with the application transport rollout;

generate one or more of a simulated user input and an application programming interface (API) request corresponding to public data related to the application transport rollout;

transmit, via the network interface, the generated one or more of the simulated user input and the API request to each of the plurality of application servers;

receive, via the network interface, a response to the transmitted one or more of the simulated user input and the API request from each application server;

identify a status of each application server based on the received response; and when the identified status for one or more of the plurality of application servers indicates an error that requested data related to the transmitted one or more of the simulated user input and the API request is absent, transmit, via the network interface, a restart instruction to the one or more application servers, wherein the restart instruction is transmitted to an operating system agent at each of the one or more application servers.

11. A computer-implemented method for automatically validating an application transport rollout, comprising:

receiving an indicator identifying a plurality of application servers associated with the application transport rollout;

generating one or more of a simulated user input and an application programming interface (API) request corresponding to public data related to the application transport rollout;

transmitting the generated one or more of the simulated user input and the API request to each of the plurality of application servers;

receiving a response to the transmitted one or more of the simulated user input and the API request from the each application server;

identifying a status of the each application server based on the received response; and when the identified statuses for one or more of the plurality of application servers indicates an error that requested data related to the transmitted one or more of the simulated user input and the API request is absent, transmitting a restart instruction to the one or more application servers without transmitting any instructions to an application layer of the one or more application servers.

12. The method of claim 11, wherein the received indicator is comprised in an application package of the application transport rollout.

13. The method of claim 12, further comprising:

transmitting the application package to a designated primary application server among the plurality of application servers to execute the application transport rollout.

14. The method of claim 11, wherein the one or more of the simulated user input and the API request are generated using robotic process automation (RPA).

15. The method of claim 11, further comprising:

when the identified status for another one or more of the plurality of application servers indicates another error, transmitting an error message to an administrator device.

16. The method of claim 11, further comprising:

after transmitting the restart instruction, repeating the steps of transmitting the generated one or more of the simulated user input and the API request, receiving the response, and identifying the status for each of the one or more application servers.

17. The method of claim 11, wherein the generated one or more of the simulated user input and the API request are transmitted to an application layer at the plurality of application servers and the restart instruction is transmitted to an operating system layer at the one or more of the application servers.

18. The method of claim 11, further comprising:

when the identified statuses for one or more of the plurality of application servers indicates the error that requested data related to the transmitted one or more of the simulated user input and the API request is absent, transmitting an error message to an administrator device.

19. The method of claim 11, further comprising:

when the identified status for each of the plurality of application servers indicates a successful response, transmitting a rollout success message to an administrator device.

20. A computer-implemented method for automatically validating an application transport rollout, comprising:

receiving an indicator identifying a plurality of application servers associated with the application transport rollout;

generating one or more of a simulated user input and an application programming interface (API) request corresponding to public data related to the application transport rollout;

transmitting the generated one or more of the simulated user input and the API request to each of the plurality of application servers;

receiving a response to the transmitted one or more of the simulated user input and the API request from the each application server;

identifying a status of the each application server based on the received response; and when the identified status for one or more of the plurality of application servers indicates an error that requested data related to the transmitted one or more of the simulated user input and the API request is absent, transmitting a restart instruction to the one or more application servers, wherein the restart instruction is transmitted to an operating system agent at each of the one or more application servers.

* * * * *